United States Patent
Janecka

(10) Patent No.: US 6,477,943 B2
(45) Date of Patent: *Nov. 12, 2002

(54) FOOD PRODUCT AND APPARATUS FOR MAKING THE FOOD PRODUCT

(76) Inventor: Danny V. Janecka, P.O. Box 7, Waelder, TX (US) 78959

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,721

(22) Filed: Jul. 20, 1999

(65) Prior Publication Data

US 2002/0009525 A1 Jan. 24, 2002

(51) Int. Cl.[7] ............... A21C 9/00; A21C 9/06; A23L 1/00; A47J 37/00; A21D 13/00
(52) U.S. Cl. ............ 99/355; 99/386; 99/443 C; 99/450.1; 99/450.2; 99/450.7; 99/537
(58) Field of Search ............ 426/94, 138, 297, 426/500, 501, 502, 523, 237; 99/352–355, 386, 443 C, 443 R, 450.1, 450.2, 450.6, 450.7, 423, 426, 427, 432

(56) References Cited

U.S. PATENT DOCUMENTS

| | | | | |
|---|---|---|---|---|
| 1,844,142 A | * | 2/1932 | Barili | 99/355 X |
| 4,457,225 A | * | 7/1984 | Bakker | 99/450.6 |
| 4,996,915 A | * | 3/1991 | Morikawa et al. | 99/450.2 |
| 5,078,120 A | * | 1/1992 | Hwang | 99/355 X |
| 5,671,660 A | * | 9/1997 | Moshonas | 99/443 C |
| 5,678,473 A | * | 10/1997 | Hughes et al. | 99/386 X |
| 5,870,947 A | * | 2/1999 | Harada | 99/450.2 |
| 6,099,885 A | * | 8/2000 | Nelson et al. | 99/450.6 X |
| 6,136,360 A | * | 10/2000 | Tsuchida et al. | 426/500 |
| 6,165,522 A | * | 12/2000 | Lira | 426/94 |
| 6,170,391 B1 | * | 1/2001 | Pomara, Jr. | 99/450.6 |
| 6,203,828 B1 | * | 3/2001 | Thota et al. | 426/502 X |

OTHER PUBLICATIONS

Sheila Lukins USA Cook Book, PP 18, 1997.*
berief, ltd. berief.
Koppen Koppens™ Belt Grill BG.
Tetra Laval Food Contherm® Scrappen–Surface Heat Exchangers.

* cited by examiner

Primary Examiner—Timothy F. Simone
(74) Attorney, Agent, or Firm—Jackson Walker LLP

(57) ABSTRACT

A food product and a method for making the same. The food product is comprised of a tortilla (either flour or corn) and a pliable, tabular food filling member. The food filling member may be an omelet, for example. The food filling member is dimensioned to overlay and substantially cover most of the tortilla. The food product is produced by laying the food filling member on top of the tortilla and rolling the two up together so that, in cross section, the food product comprised of alternating layers of tortilla and pliable food filling member.

1 Claim, 3 Drawing Sheets

Figure 1:
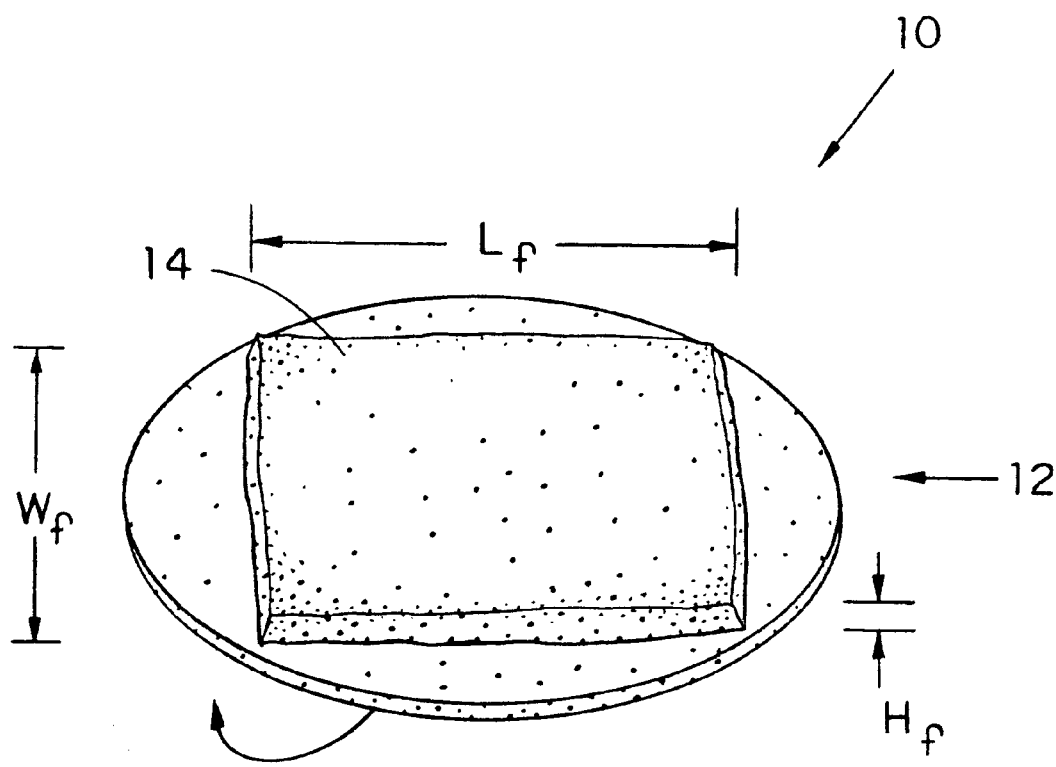
Figure 2:
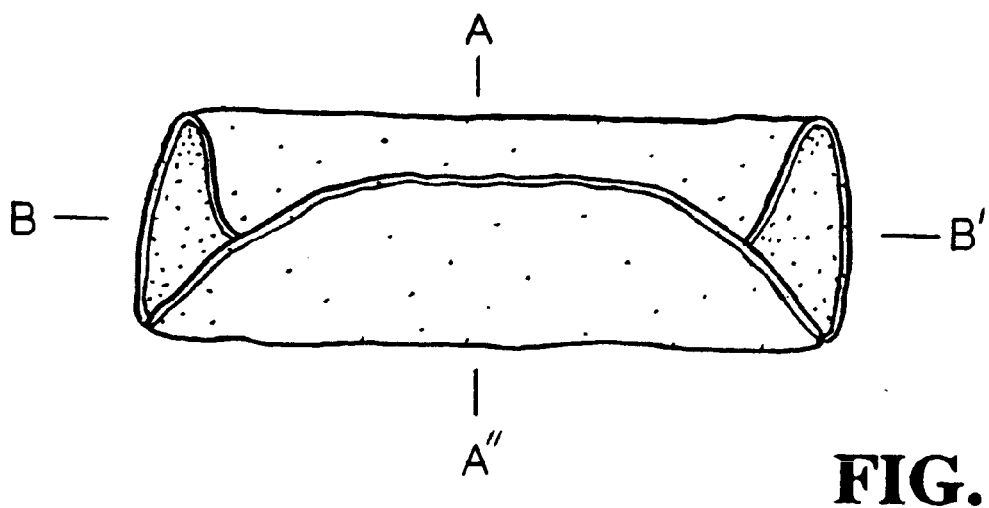

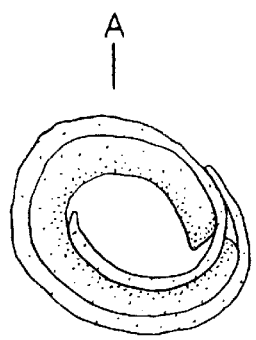
FIG. 3A
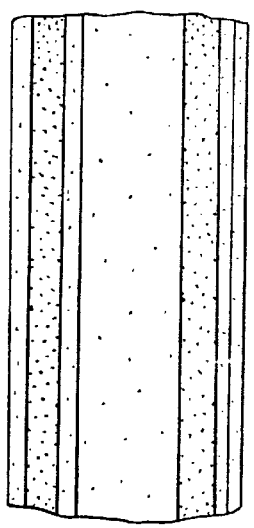
FIG. 3B
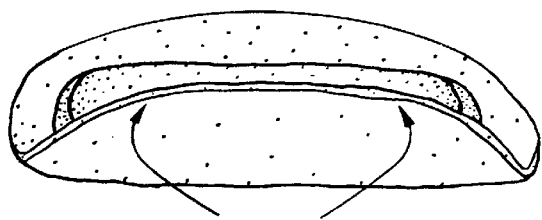
FIG. 4A
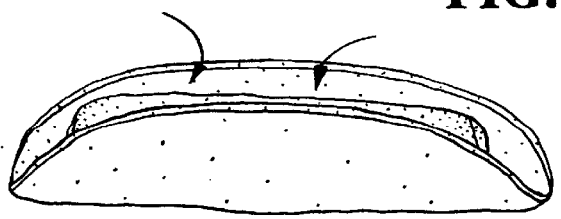
FIG. 4B

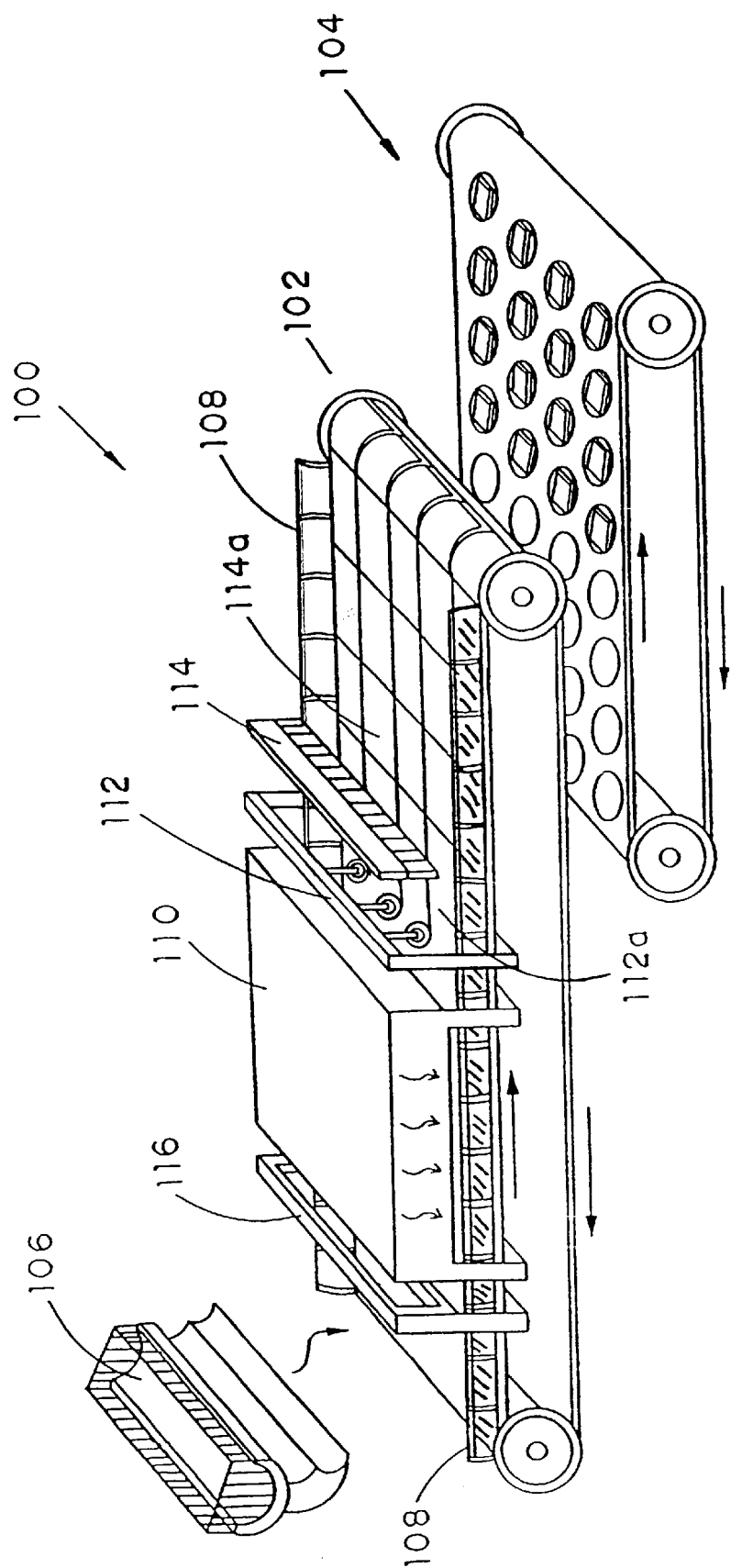

FOOD PRODUCT AND APPARATUS FOR MAKING THE FOOD PRODUCT

BACKGROUND OF THE INVENTION

1. Field of The Invention

The present invention relates to a portable food product; more particularly, to a Mexican-type food item, having a pliable, tabular, rectangular integral food filling member wrapped: (to form multiple tortilla/filling plies) in a round tortilla.

2. Background Information

Tacos and burritos are portable Mexican-type food products that contain food wrapped in a tortilla shell. They are made by placing a loose food stuffing, such as one or more of the following: scrambled eggs, beans, cheese, strips of beef, chicken, shredded lettuce, tomatoes, onions, chopped potatoes, or the like, on a round flat tortilla and then folding or rolling the tortilla around the food stuffing.

Making many tacos or burritos can be time consuming. This is especially true at fast food restaurants which rely on efficiency and speed to produce and sell their product. For example, when a customer orders an egg breakfast burrito, the cook must lay out a flat tortilla shell, ladle in some scrambled eggs. from a pan, take tomatoes, onions and/or cheese out of other containers, lay them in with the eggs, and then roll it up and hope the stuffed food does not fall out. This manual burrito building process is time consuming, especially when a large number of tacos or burritos are needed.

The term taco or burrito as used herein means a food product produced when a food filling is wrapped, or substantially enclosed, in a soft, typically round, tortilla.

A second problem exists with the present tacos and burritos; food often falls out the end if it is tilted when it is being eaten. This occurs, in part, because loose food filling is usually placed into the center of the tortilla, which makes it "fat." This gives the taco or burrito a "pregnant" or bloated look.

Therefore, it can be seen that "fat" tacos or burritos that are time consuming to make and which allow food filling to fall out can be improved upon. Applicant's present invention is designed to provide for a taco or burrito which has a specific shape to the food filling member, and to automate the manufacture of a tortilla food product and, further, to provide a food product with a sleek outer shape from which food filling does not fall out.

This and other objects are found in a portable Mexican-type taco or tortilla food product, which includes a tortilla having a flat, tabular, rectangular, pliable, sheet-like food substance rolled up therewith.

Applicant's invention includes a round flexible tortilla, typically 5 to 16 inches in diameter and 1/16 to 3/8 inch thick, onto which is placed a pliable, integral (as opposed to loose), rectangular food member, which will substantially cover the surface of the tortilla. The two are rolled together into one so that, in cross section, there are alternating food filling and tortilla plies.

The resulting food product is quicker to manufacture and it is sleeker, given that the pliable sheet-like, rectangular food member is of uniform thickness. This gives the resulting product a sleek look, not the "pregnant" look of the present burritos or stuffed tacos.

In achieving the utility set forth above, Applicant has provided an improved food product. In a food product, including a taco rolled up with a pliable, round egg omelet, applicant has provided an improvement which comprises trimming the egg omelet from a round shape to a square or rectangular shape (the term tabular being used to be either a square or a rectangular shape). Applicant has provided for additional utility in that he pours egg in liquid form, which is allowed to coagulate or solidify, in a large sheet-like member, which large sheet-like member is then sliced into a rectangular shape. That is, a rectangular sheet-like food member in a typically uniform thickness, will result in a sleek look to the rolled up burrito. Further, Applicant provides for machinery to use in conjunction with a method for making rectangular, pliable, egg food product. Machinery includes a hopper for dispensing the liquid egg mix onto a conveyor belt, which mix spreads evenly over the conveyor belt and is carried to a warming oven, and, upon leaving the oven, is sliced and cut into rectangular shapes. The warm egg food product is then deposited off the end of the conveyor belt onto warm round tortillas, being borne on a second belt. The egg food filler member and tortilla combination is then rolled and packaged according to ways known in the trade.

DETAILED DESCRIPTION OF THE PREFERRED EMBODIMENT

FIGS. 1 through 4 illustrate the preferred embodiment of Applicant's food product 10. Food product 10 is seen to comprise a round, flat, pliable tortilla 12 upon which is placed a pliable, sheet-like, flat, square or rectangular food filling member 14. The composite is rolled up to form multiple plies when viewed in cross section (AA', BB') of alternating filling and tortilla. Further, the plies in the middle section (AA') are typically the same size and number as those near the ends due to the uniform thickness and rectangular shape of the food filling member 14.

It is noted that the product is typically rolled up (see arrows in FIG. 1) such that a roll is begun perpendicular to the longitudinal axis $L_f$ of a rectangular shaped food filling member. That is the longitudinal roll should have an axis parallel to $L_f$. The food filling member is seen also to have a width $W_f$ and a height $H_f$. Moreover, the food filling member 14 is dimensioned such that it is tabular (or sheet like), meaning that it is has length and width substantially greater than its height. The height, moreover, being uniform.

The tabular food filling member may also be square, meaning $L_f = W_f$.

Further, the food filling member 14 is pliable so it can be folded along with the tortilla without cracking or breaking up. In a preferred embodiment, it is folded when both the food filling member and the tortilla are warm. (That is, at least 10° F. above room temperature.) In an alternate preferred embodiment, the food filling member is selected to have a longitudinal dimension greater than the radius of the tortilla.

The pliable tabular food filling members of the present may have the following preferred dimensions: $L_f$ equals 5 to 12 inches; $W_f$ equals 3 to 6 inches; $H_f$ equals 3/8 to 1/2 inches.

The composition of the food filling product may include: an egg omelet, potato pancake, bean and rice pancake, or other burrito fillings with recipes known in the trade.

The tortillas of the present invention may be prepared using recipes known in the trade.

The method for preparing the food product according to the present invention begins with prior art the step of preparing a circular tortilla. A pliable, tabular, integral food filling member, such as an egg omelette prepared according to recipes known in the trade, is also prepared. Following this prior art preparation, the food filling member is shaped into a rectangle, preferably while still warm, and is centered on the circular tortilla, which is also preferably warm, and the two are rolled up to form a cylindrical food product which, in cross section, has at least one alternating layer or ply of tortilla and food filling member. Before rolling, glue, such as Gar glue, may be placed along the edges of the tortilla to help keep it sealed after rolling.

FIG. 4A and FIG. 4B illustrate the rolling of a circular tortilla on which a tabular, pliable food member has been placed. A roll is started in the manner set forth above, that is typically perpendicular to the longitudinal food axis. The roll is continued until it is completed with the lip of the tortilla that was opposite the lip which started the roll (see FIG. 4B) closed down over the edge of the pliable food member.

FIG. 5 illustrates an automated production line 100 for preparing the embodiment of Applicant's food product as set forth in FIG. 1. Production line apparatus 100 includes a first conveyor belt 102 and a second conveyor belt 104. On the first end of the first conveyor belt 102 is a hopper 106 containing, and feeding onto the first conveyor belt, the pliable food member composition in liquid mix form, such as a liquid egg omelette mix. Conveyor belt 102 is seen to have edges 108 to contain the liquid mix on the surface thereof. A bar member 116, aligned perpendicular across the conveyor belt and adjustable in height may be used to help ensure uniform thickness of the food filing member by skimming off excess liquid product before it sets from liquid to a pliable solid. The liquid mix passes into an oven 110 at an intake end thereof. The oven, typically electric and containing heating elements, allows the liquid mix to cook and solidify, form a pliable, sheet-like, discreet member, which comes out of the outlet of the oven and passes across a set of cutters 112, such as rotary mounted, disc-like blades. The cutters 112 cut the food sheet member into longitudinal strips 112A. A guillotine slicer 114 may oscillate up and down timed to chop the food filling perpendicular to the slicer cuts, into discreet rectangular blocks 114A which are carried off the second end of conveyor belt 102 to fall onto the tortillas, which are carried on a second conveyor belt 104 with the rectangular, pliable food members laying flat on the tortillas. Workers standing on either side of belt 104 downstream from where the food members are placed on the tortillas, can center the food filling members if necessary, fold up the tortillas and place them in wrappers.

Although the invention is described with reference to specific embodiments, the description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for manufacturing a food product, the apparatus comprising:

a first conveyor belt, the first conveyor belt having a first end and second end and a middle portion between the two ends;

a second conveyor belt, the second conveyor belt having a first end and second end and a middle portion;

a hopper for containing a liquid mix, the hopper positioned over the first end of the first conveyor belt and for depositing a liquid mix on the first conveyor belt;

an oven positioned over the middle portion of the first conveyor belt for heating a liquid mix on the first conveyor belt;

a bar member, situated perpendicular to a longitudinal axis of the first conveyor belt for contacting a mix on the first conveyor belt, and cutting the mix perpendicular to the longitudinal axis of the first conveyor belt; and, a multiplicity of cutters placed above the conveyor belt and adjacent thereto for slicing the mix after it comes out of the oven;

wherein the second end of the first conveyor belt is positioned over the second conveyor belt so that a food product on the first conveyor belt will drop onto the second conveyor belt.

* * * * *